(12) United States Patent
Meier

(10) Patent No.: US 11,033,033 B2
(45) Date of Patent: Jun. 15, 2021

(54) CHAMBER DRUM FOR A DOUGH KNEADING DEVICE

(71) Applicant: Werner & Pfleiderer Lebensmitteltechnik GmbH, Dinkelsbühl (DE)

(72) Inventor: Alexander Meier, Dürrwangen (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 639 days.

(21) Appl. No.: 15/716,600

(22) Filed: Sep. 27, 2017

(65) Prior Publication Data

US 2018/0084789 A1     Mar. 29, 2018

(30) Foreign Application Priority Data

Sep. 27, 2016    (DE) .................... 10 2016 218 485.7

(51) Int. Cl.
*A21C 7/00*     (2006.01)
*A21C 1/14*     (2006.01)

(52) U.S. Cl.
CPC .............. *A21C 7/005* (2013.01); *A21C 1/149* (2013.01)

(58) Field of Classification Search
CPC ......... A21C 7/005; A21C 1/149; A21C 14/00; A21C 9/08; A21C 1/08; A21C 5/04; A21C 5/02; A21C 13/00; A21C 13/02; A21C 9/085; A21C 11/004; A21C 11/006; A21C 11/04; A21C 11/08; A21C 5/00; A21C 5/003; A21C 7/01; A21C 7/04; A21C 11/12; A21C 1/1465; A21C 3/027; A21C 9/04; A21C 9/066
USPC ........... 99/349, 386, 472, 485, 450.1, 450.2, 99/450.7, 462, 537, 289 D, 443 C, 447, 99/450.6, 476, 477, 486, 494; 426/496, 426/512, 519, 652
See application file for complete search history.

(56) References Cited

U.S. PATENT DOCUMENTS

| | | | |
|---|---|---|---|
| 3,272,153 A * | 9/1966 | Morabito | A21C 7/005 425/297 |
| 7,527,492 B2 | 5/2009 | Fortes | |
| 2007/0166422 A1* | 7/2007 | Fortes | A21C 7/01 425/332 |
| 2013/0022700 A1 | 1/2013 | Sauseng et al. | |

FOREIGN PATENT DOCUMENTS

| | | |
|---|---|---|
| DE | 7834943 | 3/1979 |
| DE | 102 49 496 A1 | 5/2004 |
| DE | 10304298 | 8/2004 |
| EP | 1 621 078 A1 | 2/2006 |
| NL | 9200818 | 12/1993 |

* cited by examiner

*Primary Examiner* — Christopher M Koehler
*Assistant Examiner* — Chris Q Liu
(74) *Attorney, Agent, or Firm* — Boyle Fredrickson S.C.

(57) ABSTRACT

A chamber drum for a dough kneading device comprises a hollow drum body,
 a plurality of radially penetrating breakthroughs in the outer peripheral wall thereof to form a chamber for in each case one dough piece to be treated, and
 a surface structuring of the side walls of the breakthroughs.

7 Claims, 5 Drawing Sheets

CHAMBER DRUM FOR A DOUGH KNEADING DEVICE

CROSS-REFERENCE TO RELATED APPLICATIONS

This application claims the priority of Patent Application, Serial No. 10 2016 218 485.7, filed on Sep. 27, 2016, pursuant to 35 U.S.C. 119(a)-(d), the content of which is incorporated herein by reference in its entirety as if fully set forth herein.

FIELD OF THE INVENTION

The invention relates to a chamber drum for a dough kneading device, comprising:
a hollow drum body, and
a plurality of radially penetrating breakthroughs in the outer peripheral wall thereof to form a chamber for in each case one dough piece to be treated.

BACKGROUND OF THE INVENTION

A chamber drum of this type is known from DE 102 49 496 A1. It has a hollow drum body comprising a plurality of radially penetrating breakthroughs in its outer peripheral wall to form in each case one chamber for a piece of dough to be treated.

A chamber drum of this type is an essential part of a dough kneading device in which the dough pieces are kneaded in a respective one of a plurality of chambers formed between an internal driven kneading drum, a respective breakthrough in the outer peripheral wall of the drum body and a driven kneading belt covering the chamber drum in a peripheral portion thereof.

In this kneading process, there is the problem—depending on the stickiness of the dough pieces or similar products to be treated—that in the case of very soft dough qualities, for example, the dough pieces tend to stick to the boundary surfaces of the chamber. In the case of relatively dry dough qualities, the impingement of the dough pieces seems to be in need of improvement due to a lack of adhesion between the boundary surfaces of the chamber and the dough piece.

In order to solve the problem of the dough pieces sticking to the boundary surfaces of the chambers to an excessive degree, it is already known to flour the dough kneading device by sprinkling the chamber drum with flour before receiving the dough pieces from the dough portioning device. In this case, there is the problem that the plane, smooth boundary surfaces of the chambers are naturally poorly suited to receive flour, making it virtually impossible for the flour to adhere thereto.

EP 1 621 078 A1 discloses a kneading machine for dough pieces. A kneading chamber of said kneading machine has in each case one kneading ring. The latter applies an increased lateral force to the dough piece in the lower region of the kneading chamber, resulting in an increased energy input in the lower region of the dough piece. U.S. Pat. No. 7,527,492 B3 discloses a kneading rail for rounding dough pieces. The kneading rail has the shape of a quadrant, wherein a dough piece is conveyed to this obliquely arranged kneading rail via a conveyor belt.

SUMMARY OF THE INVENTION

Therefore, the invention is based on an object of further developing a chamber drum for a dough kneading device of the generic type in such a way that the kneading behavior is improved to suit different dough qualities.

According to the invention, this object is achieved by a surface structuring of the side walls of the breakthroughs of the chamber drum, wherein the surface structuring extends entirely across all side walls of the breakthroughs.

This design of the surfaces laterally delimiting the chambers of the dough kneading device results in that the pronounced adhesion tendency, which is a common problem of plane surfaces, is reduced significantly in particular when treating dough pieces of sticky dough qualities so a sticking of dough thereto is reduced. Another effect of the surface structuring is that the surface is able to hold more flour than a smooth surface.

Finally, the surface structuring is of significant advantage not only for very sticky dough qualities but also—quite to the contrary—for relatively dry dough pieces. The transfer of momentum between the kneading surface of the breakthroughs in the chamber drum results in an increased friction between the dough piece and the side wall, with the result that a transfer of the kneading forces is improved considerably.

The surface structuring extends entirely across all side walls of the breakthroughs. In other words, the surface structuring extends in particular not only across an axial portion of the respective kneading chamber but across an entire axial extension of the kneading chamber.

In a preferred design and dimensioning of the surface structuring, recesses and/or elevations are provided in or on the surface of the respective side wall. The depth or height of these structure elements may then preferably amount to between a tenth of a millimeter and some millimeters, in other words approximately between 0.1 mm and 8 mm. The actual dimensioning is primarily based on the interaction with the respective dough qualities to be treated and may be determined by a person skilled in the art by appropriate experiments without needing inventive skill.

Production-related advantages are achieved if the recesses and/or elevations are arranged in a regular grid. The surface area of an individual grid element may then preferably amount to between 1 mm² and 50 mm², particularly preferably between 10 mm² and 30 mm².

The surface structuring may be configured in many different ways. In this manner, the structure elements, which are distributed across the surface of the side walls in a preferably regular arrangement, may be configured as elevations in the shape of a spherical ball, pyramid, truncated pyramid, cone, truncated cone, cylinder, cuboid, web, cube or any other prism shape. Structure elements in the shape of recesses may be configured in the shape of correspondingly shaped grooves, holes or dome-shaped cutouts.

According to another preferred embodiment, the side walls of the breakthroughs, which are in each case arranged opposite one another, may be arranged at an angle relative to each other that opens radially outwardly. This funnel-like positioning of the side walls arranged opposite one another improves the flouring behavior of the chambers even more.

The breakthroughs in the chamber drum may have the most various contour shapes such as a polygonal (e.g. pentagonal to dodecagonal), round or oval contour shape that may be even or uneven. A square or rectangular contour shape will however be preferable.

The outer peripheral wall of the hollow drum body may be cylindrical or configured such as to have the shape of a polygonal line when seen in cross-section. In the latter case, the breakthroughs would then each be arranged in a row in a plane peripheral portion of the cross-section configured in the shape of a polygonal line.

The invention further relates to a dough kneading device comprising an internal driven kneading drum, a chamber drum according to the invention and a driven kneading belt covering the chamber drum in a peripheral portion thereof.

Further features, details and advantages of the invention will be apparent from the ensuing description of exemplary embodiments, taken in conjunction with the enclosed drawings.

DESCRIPTION OF AT LEAST ONE PREFERRED EMBODIMENT

Figure 2:
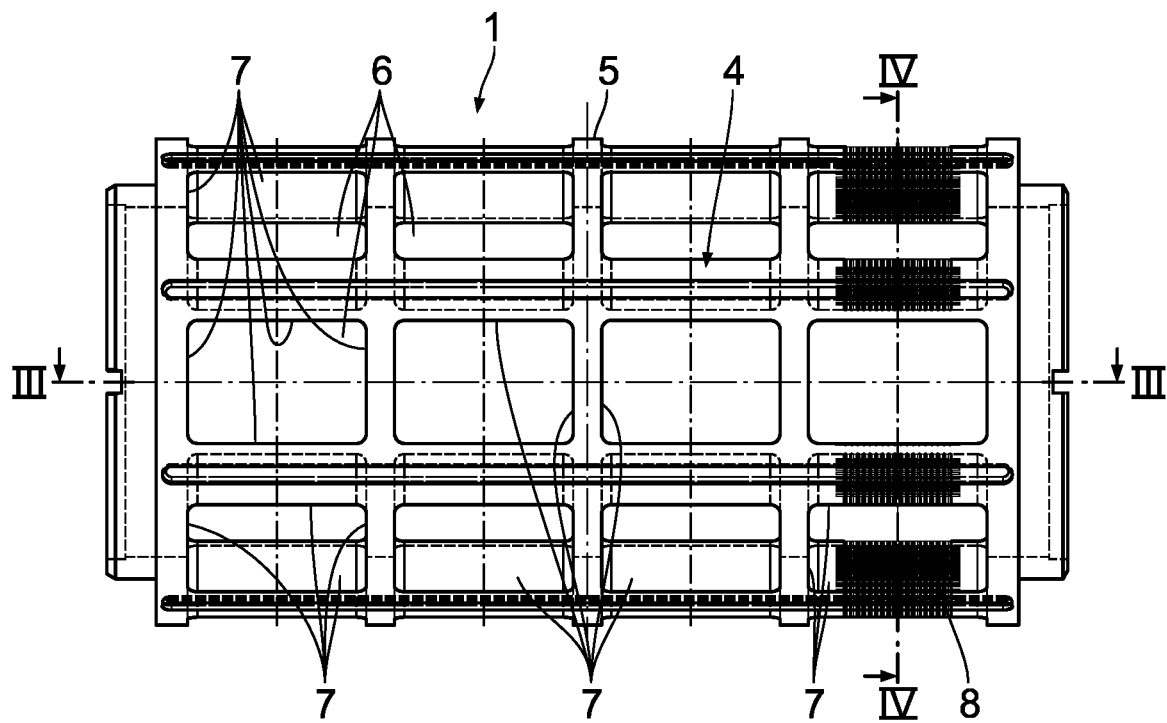
FIG. 2 shows a side view of the chamber drum in a direction transverse to its rotational axis.
Figure 3:
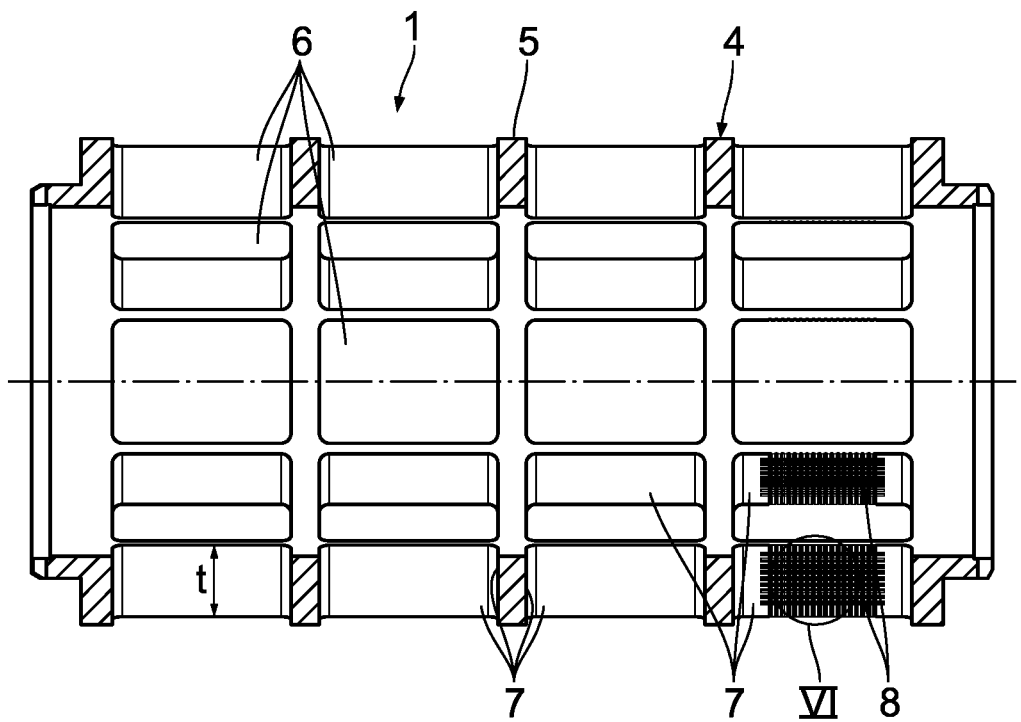
FIG. 3 shows a section, taken along the rotational axis, through the chamber drum according to section line in FIG. 2.
Figure 4:
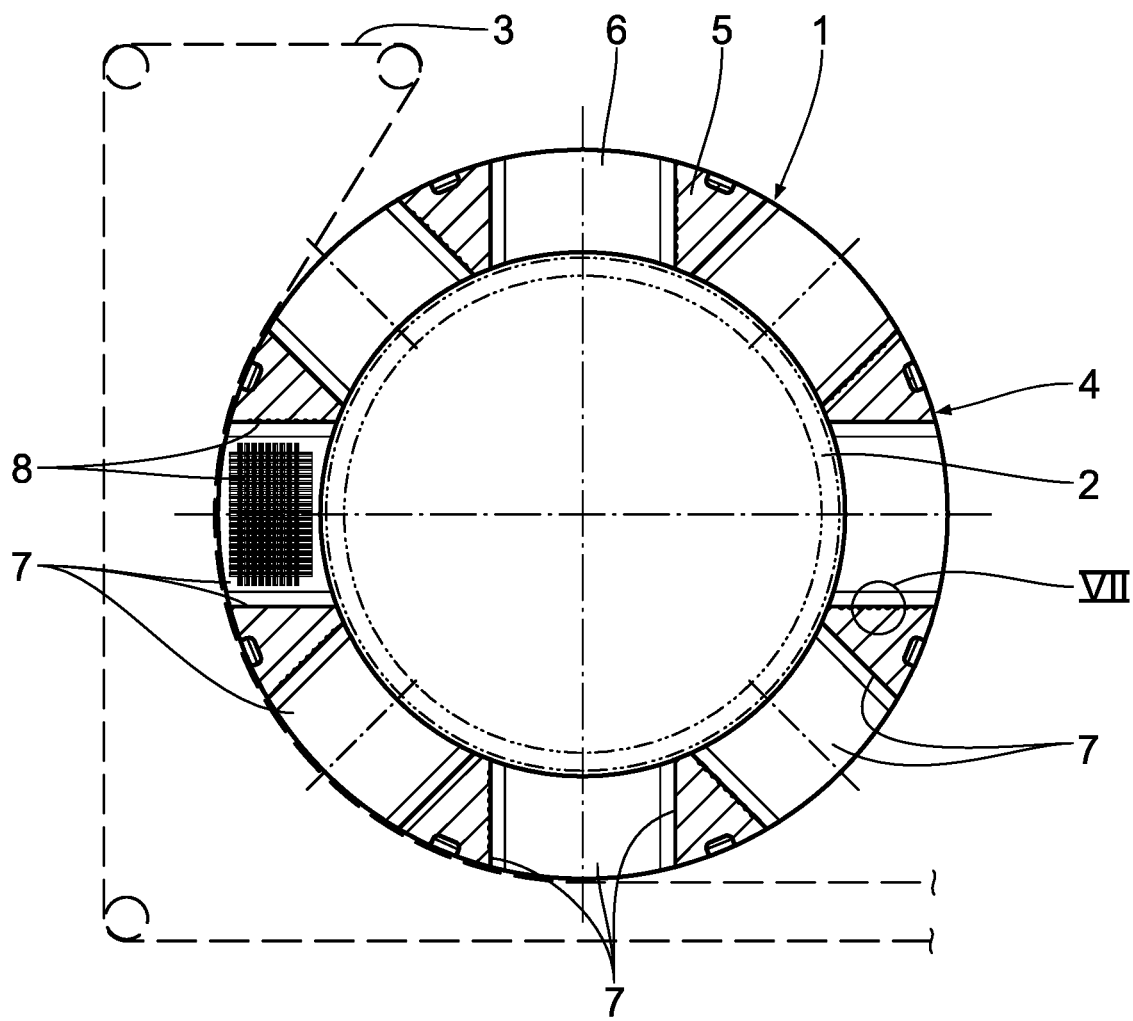
FIG. 4 shows a cross-section through the chamber drum according to section line IV-IV in FIG. 2 in an installation position, outlined by dashed lines, in a dough kneading device.

The chamber drum 1 shown in FIGS. 1 to 4 is an essential part of a dough kneading device shown with its essential components in FIG. 4. Along with the chamber drum 1, said dough kneading device further has the internal kneading drum 2 (shown by double-dash dotted lines) driven relative to the chamber drum 1 in the rotational and axial directions as well as a kneading belt 3 (shown by dashed lines), which is driven as well and covers a peripheral portion of the chamber drum 1. The general mode of operation of this dough kneading device is known and need not be discussed in detail again.

The chamber drum 1 has a support element in the form of a hollow drum body 4 the cylindrical outer peripheral wall 5 of which is provided with a plurality of radially penetrating breakthroughs 6. In the exemplary embodiment shown, the breakthroughs 6 have a rectangular contour shape with slightly rounded corner regions. Sharp-edged shapes with or without chamfers in the edge regions are conceivable as well. In the embodiment shown, eight rows, each comprising four breakthroughs 6 of this type, are provided such as to be evenly distributed across the length and periphery of the drum body 4. The size, number and arrangement of the breakthroughs 6 may vary depending on the dough pieces to be treated and the capacity of the dough kneading device. As a general rule, it is conceivable to provide a random number of rows each comprising a random number of breakthroughs. Each breakthrough 6 forms a chamber with the internal kneading drum 2 and the external kneading belt 3 in which the dough piece to be treated therein is kneaded accordingly while circulating in the peripheral portion of the chamber drum 1 covered by the kneading belt 3, and is then discharged.

Figure 1:
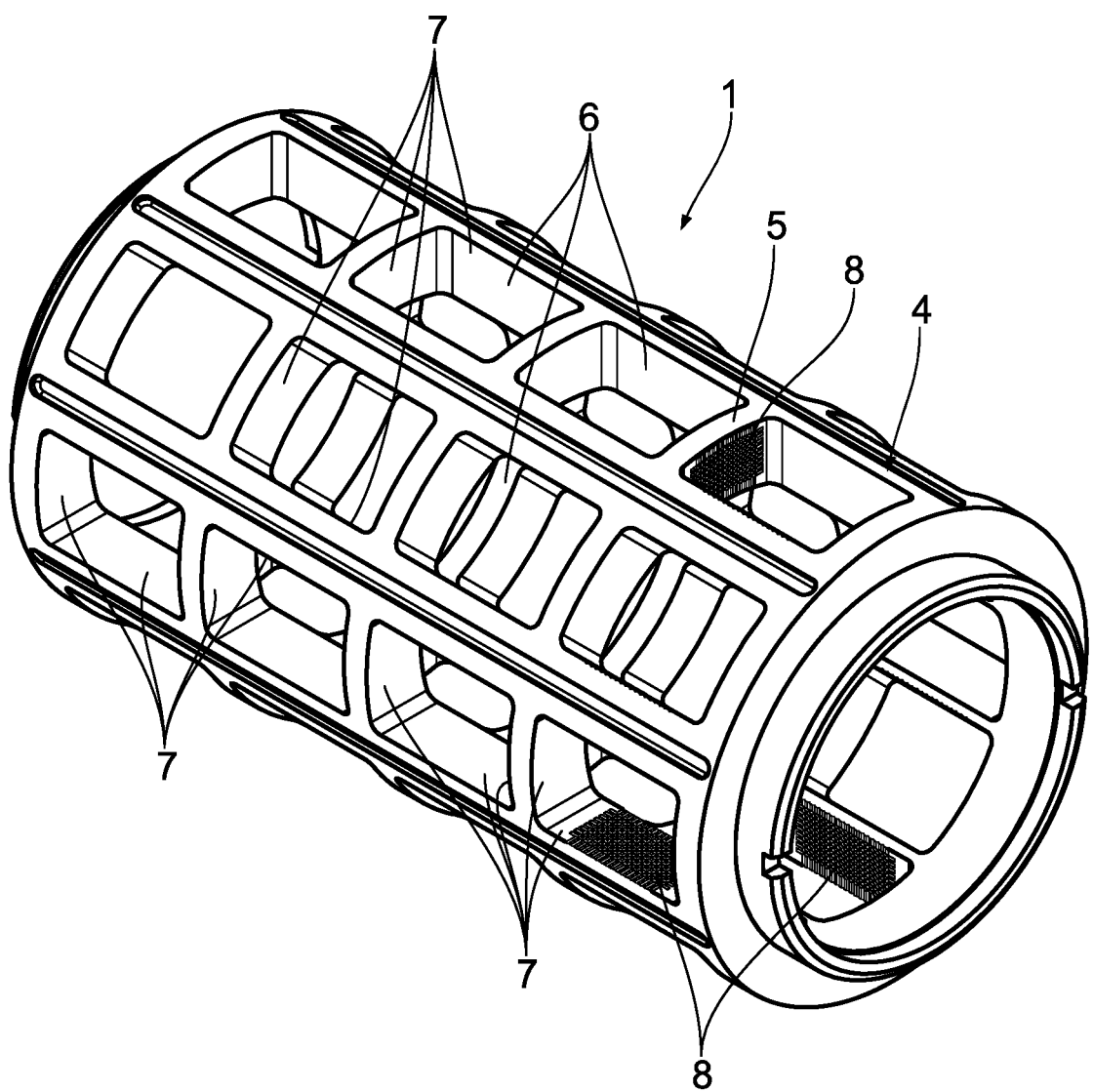
FIG. 1 shows a perspective view of a chamber drum for a dough kneading device.

As shown in FIGS. 1 to 3 only for two different breakthroughs 6 in a partial surface thereof only, the surface of the side walls 7 of the breakthroughs is provided with a surface structure 8. Other than shown in the drawing, these extend across the entire side walls 7 of all breakthroughs 6.

Figure 6:
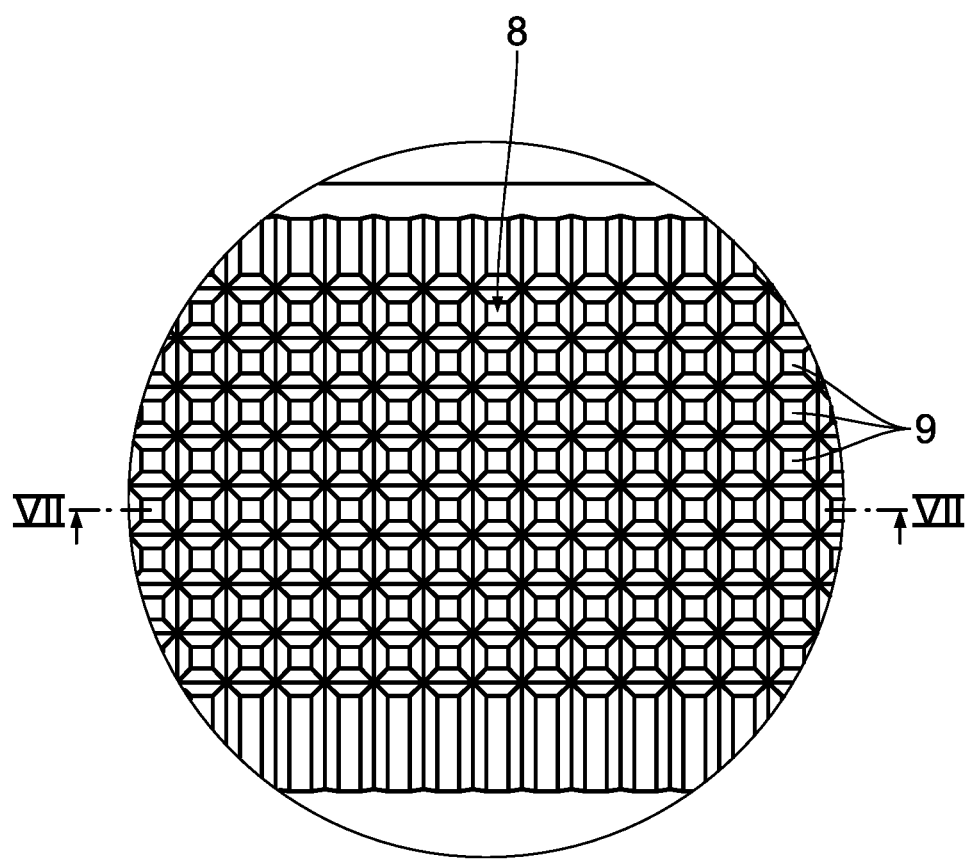
FIG. 6 shows an enlarged detail plan view of the side wall of a breakthrough of the chamber drum according to detail VI in FIG. 3.
Figure 7:
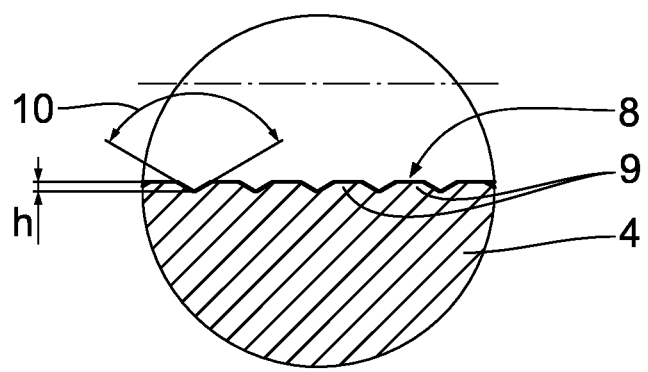
FIG. 7 shows a section through the side wall of a breakthrough of the chamber drum according to section line VII-VII in FIG. 6, and FIGS. 8 and 9 show sections, similar to FIG. 6, with further different embodiments of the surface structuring.

As can be seen from FIGS. 6 and 7, the surface structuring 8 in this embodiment is formed by elevations 9 in the shape of truncated pyramids arranged in a close-packed manner in a regular grid. An irregular arrangement may be provided as well. The square footprint of these elevations 9 is approximately 20 to 25 mm$^2$ while the height h thereof is approximately 0.6 mm to 0.8 mm.

As can be seen from FIG. 4, the opposing side walls 7 of each breakthrough 6 are arranged parallel to each other in this embodiment in the usual manner.

Figure 5:
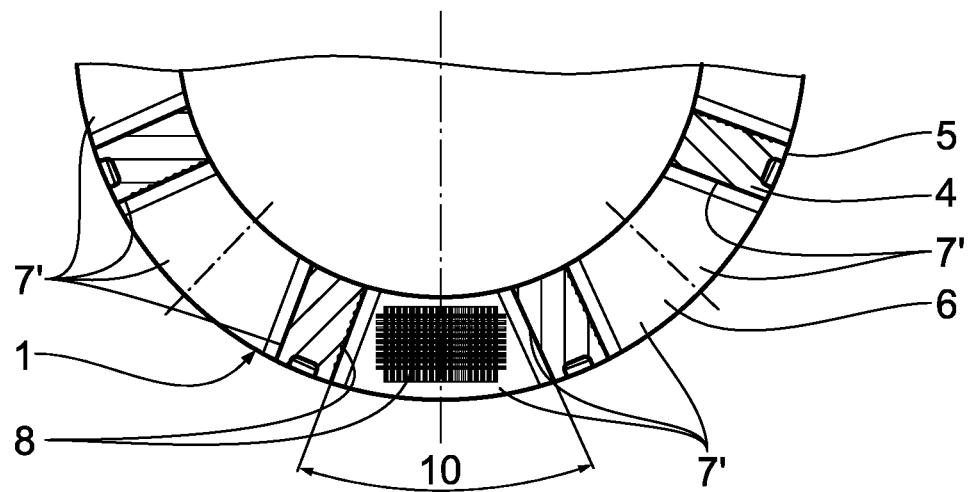
FIG. 5 shows a cross-section through a chamber drum in an alternative embodiment.

In the embodiment shown in FIG. 5, the side walls 7' running parallel to the rotational axis of the chamber drum 1 are oriented radially parallel in such a way that they are oriented in an angle 10 opening radially outwardly. As such these side walls 7' are arranged at a more obtuse angle with respect to the peripheral surface of the chamber drum 1, which—as already mentioned above—facilitates the flouring of the side walls 7'.

Figure 8:
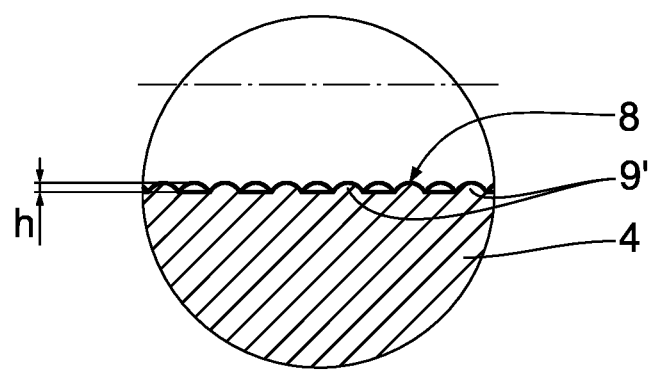

In the embodiment shown in FIG. 8, the structuring 8 is formed by elevations 9' in the shape of spherical-ball-shaped nubs. As can be seen in FIG. 8, the rows thereof are staggered with respect to each other in such a way that each nub faces an opposing gap. The dimensioning of the nubs is in the order of magnitude of the truncated pyramid-shaped elevations 9 in the embodiment according to FIGS. 6 and 7.

The base diameter of the nubs is 4 mm while the height h thereof is 1 mm, for example.

Figure 9:
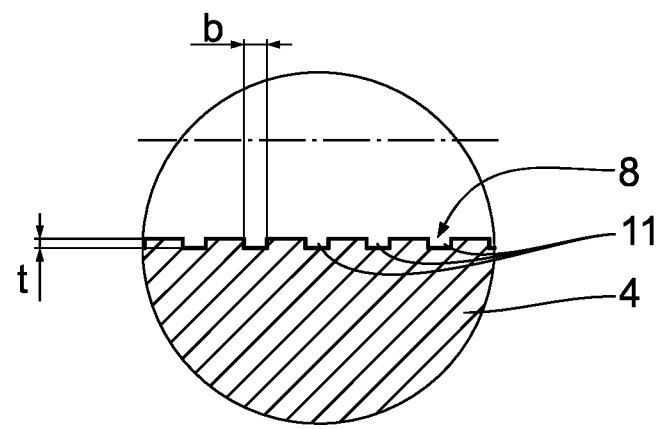

In the embodiment shown in FIG. 9, the surface structuring 8 is formed by recesses 11 in the shape of cut-in grooves arranged parallel to each other at regular distances. Their cross-sectional area (width b×depth t) is approximately 1 mm×1 mm while their distance is 2 mm, for example.

What is claimed is:

1. A chamber drum for a dough kneading device, comprising:
   a hollow drum body; and
   a plurality of radially penetrating breakthroughs in an outer peripheral wall of the drum body to form chambers for receiving, in each case, one dough piece to be treated,
   wherein walls of each of the breakthroughs have a surface structuring provided thereon or therein,
   wherein the surface structuring extends entirely across all side walls of each the breakthroughs,
   wherein the surface structuring is formed by at least one of 1) recesses formed in or on a surface of the respective side wall and 2) elevations provided in or on the surface of the respective side wall, wherein at least one of a depth (t) and a height (h) of the surface structuring is at least 0.1 mm,
   wherein the surface structuring comprises recesses formed at least in or on the surface of the respective side wall, and wherein at least one of the depth (t) of the recesses in the surface of the respective side wall and the height (h) of the recesses on the surface of the respective side wall is between 0.1 mm and 8 mm,
   wherein the surface structuring is formed by elevations, each formed in the shape of one of: a spherical ball, a pyramid, a truncated pyramid, a cone, a truncated cone, a cylinder, a cuboid, a web, a cube and a prism, wherein the elevations are arranged across the surfaces of the side walls of the breakthroughs in a regular manner, and wherein side walls of each of the breakthroughs that are arranged opposite one another are arranged parallel to each other and extend at an angle that opens radially outwardly.

2. The chamber drum according to claim 1, wherein the at least one of the recesses and the elevations are arranged as grid elements, and wherein a surface area of an individual grid element is between 1 mm$^2$ and 50 mm$^2$.

3. The chamber drum according to claim 2, wherein the at least one of the recesses and the elevations are arranged as grid elements, wherein a surface area of an individual grid element is between 10 mm$^2$ and 30 mm$^2$.

4. The chamber drum according to claim 1, wherein the surface structuring is formed by recesses each formed in the shape of one of: grooves, holes, and dome-shaped cutouts that are arranged across the surfaces of the side walls of the breakthroughs in a regular manner.

5. The chamber drum according to claim 1, wherein each of the breakthroughs has a shape of at least one of: a square, a rectangle, and a polygon.

6. The chamber drum according to claim 1, wherein the outer peripheral wall of the hollow drum body is configured cylindrically or in the shape of a polygonal line when seen in a cross-section.

7. A dough kneading device comprising
an internal driven kneading drum,
a chamber drum for a dough kneading device, comprising a hollow drum body, and
a plurality of radially penetrating breakthroughs in an outer peripheral wall of the drum body to form chambers for receiving, in each case, one dough piece to be treated, wherein side walls of the breakthroughs have a surface structuring provided thereon or therein, wherein the surface structuring extends entirely across all side walls of each of the breakthroughs, wherein the surface structuring is formed by at least one of 1) recesses formed in or on a surface of the respective side wall and 2) elevations provided in or on the surface of the respective side wall, wherein at least one of a depth (t) and a height (h) of the surface structuring is at least 0.1 mm, wherein the surface structuring comprises recesses formed at least in or on the surface of the respective side wall, and wherein at least one of the depth (t) of the recesses in the surface of the respective side wall and the height (h) of the recesses on the surface of the respective side wall is between 0.1 mm and 8 mm, wherein the surface structuring is formed by elevations each formed in the shape of one of: a spherical ball, a pyramid, a truncated pyramid, a cone, a truncated cone, a cylinder, a cuboid, a web, a cube and a prism, wherein side walls of each of the breakthroughs that are arranged opposite one another are arranged parallel to each other, and wherein the elevations are arranged across the surfaces of the side walls of the breakthroughs in a regular manner, and further comprising a driven kneading belt covering a peripheral portion of the chamber drum.

* * * * *